United States Patent
Hitosuga (10) Patent No.: US 9,519,365 B2
(45) Date of Patent: Dec. 13, 2016

(54) DISPLAY CONTROL APPARATUS AND CONTROL METHOD FOR THE SAME

(71) Applicant: CANON KABUSHIKI KAISHA, Tokyo (JP)

(72) Inventor: Emi Hitosuga, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 4 days.

(21) Appl. No.: 13/804,313

(22) Filed: Mar. 14, 2013

(65) Prior Publication Data

US 2013/0249829 A1 Sep. 26, 2013

(30) Foreign Application Priority Data

Mar. 23, 2012 (JP) ................... 2012-067939

(51) Int. Cl.
- *G06F 3/048* (2013.01)
- *G06F 3/041* (2006.01)
- *G06F 3/0488* (2013.01)
- *G06F 3/0482* (2013.01)
- *G06F 3/0484* (2013.01)

(52) U.S. Cl.
CPC ............ *G06F 3/041* (2013.01); *G06F 3/0482* (2013.01); *G06F 3/0488* (2013.01); *G06F 3/04847* (2013.01)

(58) Field of Classification Search
CPC ................................. G06F 3/048; G06F 3/041
USPC ............................................................. 345/173
See application file for complete search history.

(56) References Cited

U.S. PATENT DOCUMENTS

| | | | |
|---|---|---|---|
| 5,559,301 A | 9/1996 | Bryan et al. | |
| 8,094,132 B1* | 1/2012 | Frischling | G06F 3/0481 |
| | | | 178/18.01 |
| 8,533,631 B2* | 9/2013 | Ha et al. | 715/841 |
| 8,564,544 B2* | 10/2013 | Jobs et al. | 345/173 |
| 2004/0056837 A1* | 3/2004 | Koga | G06F 1/16 |
| | | | 345/156 |
| 2008/0084398 A1* | 4/2008 | Ito et al. | 345/173 |
| 2008/0168384 A1* | 7/2008 | Platzer | G06F 3/04845 |
| | | | 715/784 |

(Continued)

FOREIGN PATENT DOCUMENTS

| | | |
|---|---|---|
| CN | 101611373 A | 12/2009 |
| CN | 101861562 A | 10/2010 |

(Continued)

*Primary Examiner* — Nicholas Lee
*Assistant Examiner* — Duane N Taylor, Jr.
(74) *Attorney, Agent, or Firm* — Canon U.S.A., Inc. IP Division (57) ABSTRACT

A display control apparatus enables a user to perform a touch operation more simply and easily on a screen including a first item permitting a setting change without screen transition and a second item permitting a setting change after transition of the screen to a different display screen. On a display screen with a plurality of items including the first item and the second item, when a touch-down operation is detected in an area of the first item while the first item is selected, the display control apparatus invalidates a move operation for selecting other items. On the other hand, when a touch-down operation is detected in an area of the second item while the second item is selected, the display control apparatus validates a move operation for selecting other items.

10 Claims, 6 Drawing Sheets

(56) References Cited

U.S. PATENT DOCUMENTS

| | | | |
|---|---|---|---|
| 2010/0017732 A1* | 1/2010 | Matsushima | G06F 9/4443 715/765 |
| 2011/0107267 A1 | 5/2011 | Ha et al. | |
| 2013/0061180 A1* | 3/2013 | Dongen | G06F 3/04847 715/847 |

FOREIGN PATENT DOCUMENTS

| | | |
|---|---|---|
| CN | 102037435 A | 4/2011 |
| JP | 8-339223 A | 12/1996 |
| JP | H11338600 A | 12/1999 |
| JP | 2002373057 A | 12/2002 |
| JP | 2008226282 A | 9/2008 |
| JP | 2009141710 A | 6/2009 |
| JP | 2010239610 A | 10/2010 |

* cited by examiner

DISPLAY CONTROL APPARATUS AND CONTROL METHOD FOR THE SAME

BACKGROUND OF THE INVENTION

1. Field of the Invention

The present disclosure relates to a display control apparatus and a control method for the same. More particularly, the present disclosure relates to a suitable technique for an operation on a touch panel.

2. Description of the Related Art

As functions of an electronic apparatus have become more diversified and complicated in recent years, a user has more difficulty in setting these functions. Accordingly, electronic apparatuses tend to have user-friendly touch panels in many cases. However, even when the user-friendly touch panel is used, a user still has difficulty in setting a complicated function.

Japanese Patent Application Laid-Open No. 8-339223 discusses an electronic apparatus including a touch panel. The electronic apparatus has a function of updating a display screen and rewriting a control value. According to this function, a plurality of setting items of control values is first displayed. When a setting item is operated among the plurality of displayed setting items, a control value setting screen for the operated setting item is displayed. Subsequently, when up and down keys on the touch panel are operated, the display screen is updated and the control value is rewritten. Moreover, U.S. Pat. No. 5,559,301 discusses a function of displaying a scale on a touch panel. When the scale is touched, the scale is enlarged and displayed.

Since display patterns on a display screen on a touch panel have been diversified in recent years, there are cases where, for example, "an item for which a value is set on a screen without switching the screen" and "an item for which a value is set on a different screen" are displayed alongside on one screen. On such a screen, a user performs a move operation after touching down "the item for which a value is set on a screen without switching the screen" with a finger or pen to set a value. However, if the user accidentally touches another item, a selected item changes. That causes the user confusion. Consequently, a selected item may be set such that a change thereof is not permitted after a user performs a touch-down operation on the item. However, there are cases where the selected item needs to be changed after the touch-down operation is performed on one item. In this case, the selected item should be changed by a move operation after "the item for which a value is set on a different screen" is touched down. Otherwise, the selected item cannot be changed until a screen is shifted to the different screen and then returns to an initial screen. That causes inconvenience to the user.

SUMMARY OF THE INVENTION

The present disclosure is directed to a display control apparatus enabling a user to perform a touch operation more simply and easily on a screen including an item having a screen permitting a setting change and an item having a screen causing the screen to transition to a different display screen.

According to an aspect of the present disclosure, a display control apparatus includes a detection unit configured to detect a touch operation on a display unit, a display control unit configured to control a display screen to be displayed on the display unit, the display screen including a plurality of items including a first item enabling a user to change a setting value in response to the touch operation in an area of the first item without screen transition, and a second item enabling the display screen to transition to a different display screen in response to the touch operation in an area of the second item, a selection unit configured to select one of the plurality of items in response to the touch operation detected by the detection unit, and a control unit configured to, if the first item is selected by the selection unit, when a touch-down operation for touching the display screen in a non-touch state is detected in the area of the first item by the detection unit, control the selection unit not to change the selected item in response to the touch operation continuing from the touch-down operation, and, if the second item is selected by the selection unit, when a touch-down operation is detected in the area of the second item by the detection unit, control the selection unit to change the selected item in response to the touch operation continuing from the touch-down operation.

According to an exemplary embodiment of the present disclosure, on a screen including an item having a screen permitting a setting change and an item having a screen causing the screen to transition to a different display screen, a user can perform a touch operation more simply and easily.

Further features and aspects of the present disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the disclosure.

DESCRIPTION OF THE EMBODIMENTS

Various exemplary embodiments, features, and aspects of the disclosure will be described in detail below with reference to the drawings.

Figure 1:
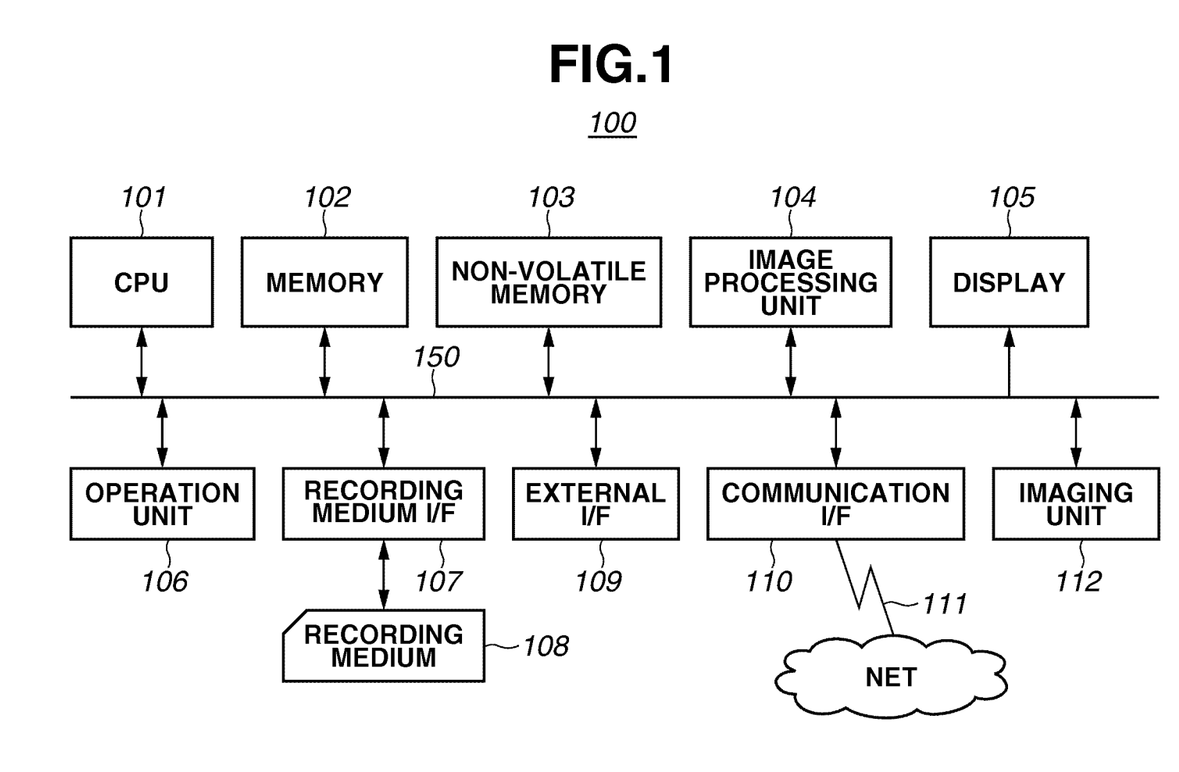
FIG. 1 is a block diagram illustrating a configuration example of a display control apparatus according to an exemplary embodiment of the present disclosure.

A display control apparatus according to a first exemplary embodiment of the present disclosure is described with reference to drawings. FIG. 1 is a block diagram illustrating a configuration example of a display control apparatus 100 according to the present exemplary embodiment. This display control apparatus 100 may be installed in an electronic apparatus such as a digital camera, electronic tablet, cellular telephone, smartphone or the like.

In FIG. 1, a central processing unit (CPU) 101, a memory 102, a non-volatile memory 103, an image processing unit 104, a display 105, an operation unit 106, a recording medium interface (I/F) 107, an external I/F 109, and a communication I/F 110 are connected to an internal bus 150. These units connected to the internal bus 150 can mutually exchange data via the internal bus 150.

The memory 102 includes, for example, a random access memory (RAM) (e.g., a volatile memory using a semiconductor device). The CPU 101 controls each unit of the display control apparatus 100 using the memory 102 as a work memory according to a program stored in the non-volatile memory 103, for example. The non-volatile memory 103 stores image data, audio data, other data, and various programs for operating the CPU 101. For example, the non-volatile memory 103 includes a hard disk (HD) and a read-only memory (ROM).

The image processing unit 104 performs, based on control of the CPU 101, various image processing on image data stored in the non-volatile memory 103 and a recording medium 108, and a video signal acquired via the external I/F 109. Moreover, the image processing unit 104 performs various image processing on imaged data acquired via the communication I/F 110, and image data acquired by an imaging unit 112. The image processing performed by the image processing unit 104 includes analog-to-digital (A/D) conversion processing, digital-to-analog (D/A) conversion processing, image data coding processing, compression processing, decoding processing, enlargement/reduction (resize) processing, noise reduction processing, and color conversion processing. The image processing unit 104 may include a circuit block dedicated to specific image processing. Moreover, in some image processing, the CPU 101 may perform the image processing according to a program without the image processing unit 104.

The display 105 displays, based on control of the CPU 101, an image and a graphical user interface (GUI) screen of GUI. The CPU 101 generates a display control signal according a program, and controls each unit of the display control apparatus 100 such that a video signal for displaying a video on the display 105 is generated and output to the display 105. Accordingly, the display 105 displays the video based on the video signal. The display control apparatus 100 may include the units up to the interface for outputting the video signal for displaying the video on the display 105, and the display 105 may include an external monitor.

The operation unit 106 includes a character information input device such as a keyboard, a pointing device such as a mouse and a touch panel, a button, a dial, a joystick, a touch sensor, a touch pad, a power switch, and a shutter button. The operation unit 106 is an input device for receiving a user operation. The touch panel, serving as an input device, is flatly overlaid on the display 105 such that coordinate information corresponding to a contacted position is output.

In the recording medium I/F 107, a memory card, and the recording medium 108, such as a compact disc (CD) and a digital versatile disk (DVD), can be mounted. The recording medium I/F 107 reads data from the mounted recording medium 108 and writes data into the recording medium 108 based on control of the CPU 101. The external I/F 109 is connected to an external device using a wired cable or by wireless to input and output a video signal and an audio signal. The communication I/F 110 transmits and receives various data, such as a file and a command, by communicating with an external device and an internet 111. The imaging unit 112 includes a charge-coupled device (CCD) sensor or a complementary metal-oxide semiconductor (CMOS) sensor for converting an optical image into an electric signal.

The operation unit 106 includes the touch panel, and the CPU 101 can detect the following touch operations on the touch panel.
1) a user touches the touch panel with a finger or a pen (hereinafter, referred to as a touch-down operation).
2) a user is touching the touch panel with a finger or a pen (hereinafter, referred to as a touch-on operation).
3) a user moves a finger or a pen while touching the touch panel with the finger or the pen (hereinafter, referred to as a move operation).
4) a user removes a finger or a pen from the touch panel (hereinafter, referred to as a touch-up operation).
5) the touch panel is not touched by anything (hereinafter, referred to as a touch-off operation).

These operations, and coordinate information of a position in which a finger or pen is touching on the touch panel are notified to the CPU 101 via the internal bus 150. The CPU 101 determines what operation has been performed on the touch panel based on the notified information. Herein, as for the move operation, the CPU 101 can determine a movement direction of the finger or the pen moving on the touch panel for each vertical component and horizontal component on the touch panel based on changes in position coordinates.

Moreover, a series of operations from the touch-down to the touch-up via a certain move operation on the touch panel is called an operation for drawing a stroke. An operation for quickly drawing a stroke is called a flick. In the flick operation, a user quickly moves a finger for a certain distance with the finger touching the touch panel, and then, the user simply removes the finger from the touch panel. In other words, a finger quickly slides on the touch panel, just like a flick with a finger. When a move operation of a predetermined distance or more at a predetermined speed or higher is detected, and then, a touch-up operation is detected, the CPU 101 can determine that a flick operation has been performed.

On the other hand, when a move operation of a predetermined distance or more at lower than a predetermined speed is detected, the CPU 101 determines that a drag operation has been performed. Among touch panels employing various methods, such as a resistance film method, an electrostatic capacitance method, a surface acoustic wave method, an infrared method, an electromagnetic induction method, an image recognition method, and an optical sensor method, any method can be employed.

Figure 2:
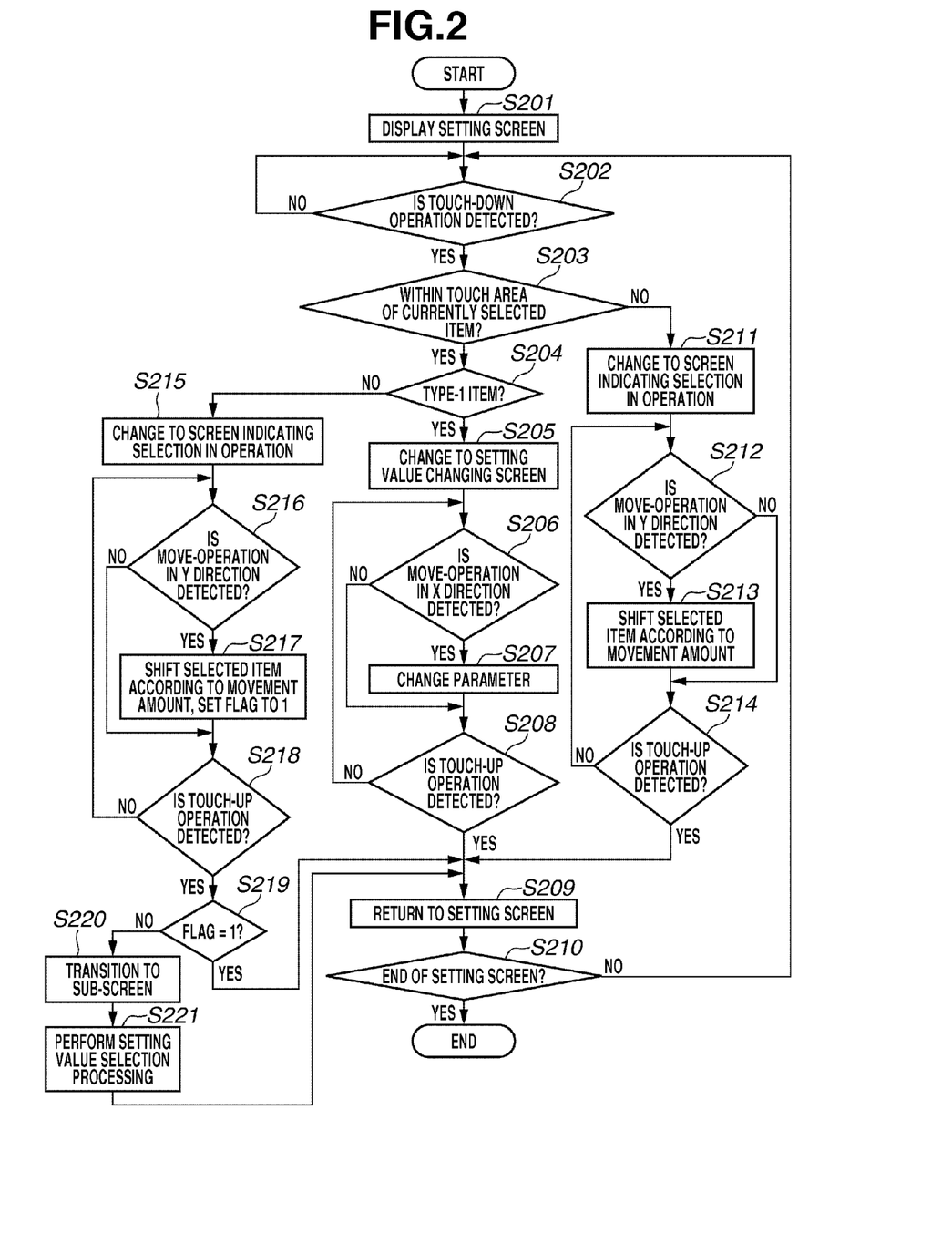
FIG. 2 is a flowchart illustrating an example procedure for displaying a setting screen according to the exemplary embodiment of the present disclosure.

FIG. 2 is a flowchart illustrating an example procedure of processing performed by the display control apparatus 100 according to the present exemplary embodiment. The CPU 101 executes the processing of the flowchart by executing a display control program stored in the memory 102 corresponding to an instruction received from the operation unit 106. The processing according to the present exemplary embodiment is described by using display screens illustrated in FIGS. 3 to 6 as examples.

Figure 3:
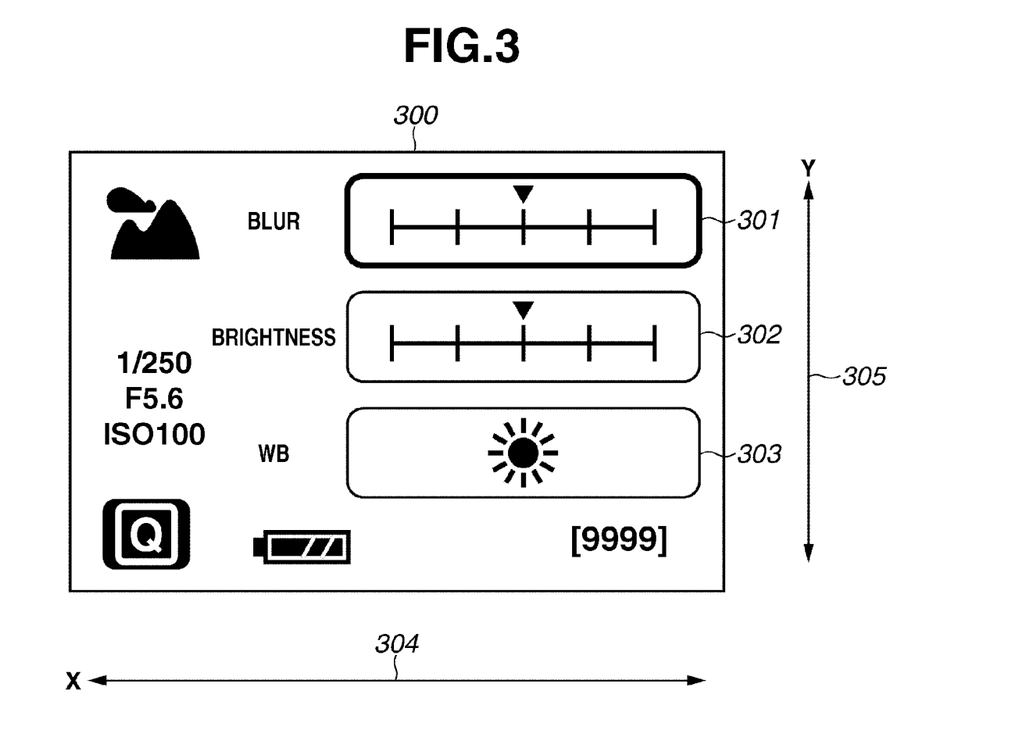
FIG. 3 is a diagram illustrating an example of a setting screen to be displayed first.

When a user operates the operation unit 106, for example, to give an instruction to open a setting screen as illustrated in FIG. 3, the CPU 101 starts the processing illustrated in FIG. 2. In step S201, the CPU 101 causes the display 105 to display a setting screen 300.

In step S202, the CPU 101 waits until a touch-down operation on a touch panel is detected. If the touch-down operation is detected (YES in step S202), then in step S203, the CPU 101 determines whether an area, in which the touch-down operation is detected, is within a touch area of a currently selected item (e.g., a "blur" item 301 in FIG. 3). If the area in which the touch-down operation is detected is within the touch area of the currently selected item (YES in step S203), the operation proceeds to step S204. If the area in which the touch-down operation is detected is not within the touch area of the currently selected item (NO in step S203), the operation proceeds to step S211.

In step S204, the CPU 101 determines whether the currently selected item on which the touch-down operation is detected is a type-1 item. Herein, the type-1 item represents an item for which a value can be set on the same screen. In addition, there is a type-2 item in the present exemplary embodiment. The type-2 item represents an item for which a value needs to be set on a different screen. In the example illustrated in FIG. 3, the "blur" item 301 and a "brightness" item 302 serve as the type-1 items (first items), whereas a "white balance (WB)" item 303 serves as the type-2 item (a second item). If the currently selected item is determined as the type-1 item (YES in step S204), the operation proceeds to step S205. On the other hand, if the currently selected item is determined as the type-2 item (NO in step S204), the operation proceeds to step S215.

Figure 4A:
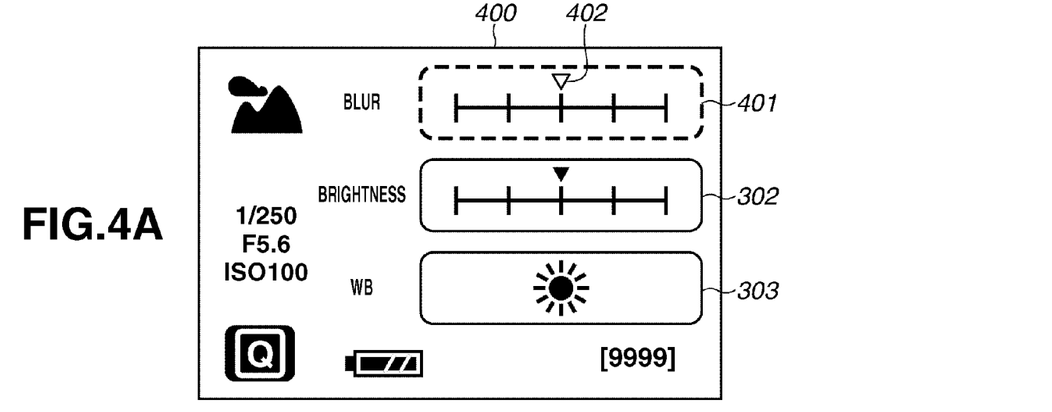
FIGS. 4A, 4B, and 4C are diagrams each illustrating an example setting screen on which a value can be set by a move operation.

In step S205, the CPU 101 causes the display 105 to display a setting screen 400 as illustrated in FIG. 4A by changing the screen. In the example illustrated in FIG. 4A, a "blur" item 401 is selected, and an operation for changing a setting value 402 of the item 401 is being accepted (in operation) at this time. In this state, the CPU 101 performs an operation for changing the setting value 402 of the "blur" item 401, that is, changes a setting value and a display on the screen in response to a move operation in an X direction 304 (X-component of the move operation) illustrated in FIG. 3. Herein, the CPU 101 does not react to a move operation in a Y direction 305 (Y-component of the move operation) illustrated in FIG. 3, and invalidates (does not accept) operations for selecting other items.

Subsequently, in step S206, the CPU 101 determines whether the move operation in the X direction 304 is detected on the touch panel. If the move operation in the X direction 304 is detected (YES in step S206), the operation proceeds to step S207. If the move operation in the X direction 304 is not detected (NO in step S206), the operation proceeds to step S208.

Figure 4B:
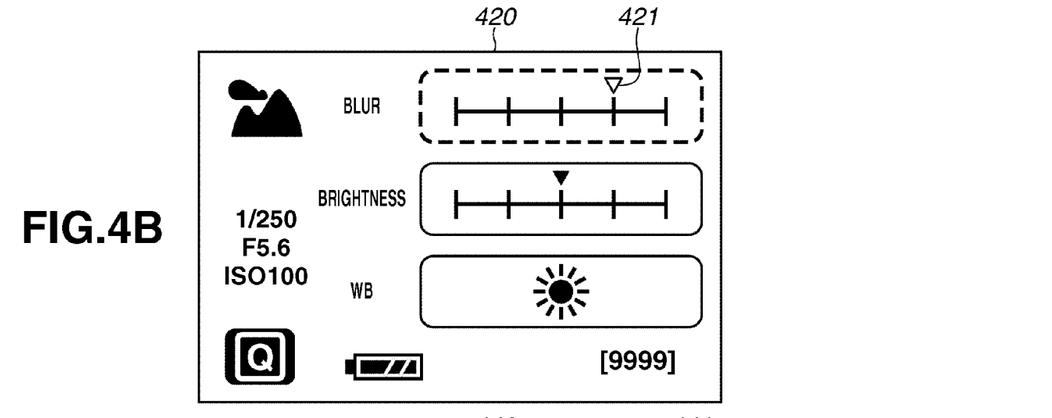
Figure 4C:
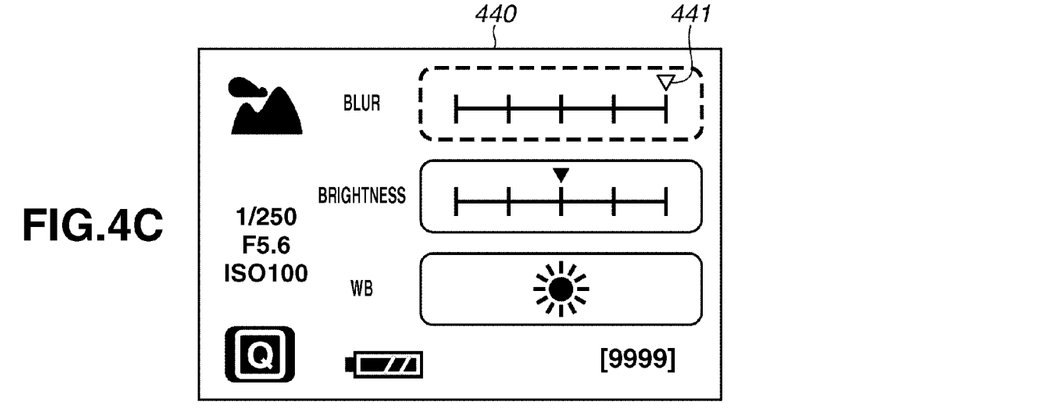

In step S207, the CPU 101 determines an amount of the movement in the X direction on the touch panel, and causes the display 105 to display a screen on which the setting value 402 is shifted according to the movement amount. When the setting value 402 is shifted to a new position, the CPU 101 stores the new value in the memory 102. A setting screen 420 in FIG. 4B illustrates a case where the position of the setting value 402 illustrated in FIG. 4A is shifted to the right by one level to a position of a setting value 421. A setting screen 440 in FIG. 4C illustrates a case where the position of the setting value 402 illustrated in FIG. 4A is shifted to the right by two levels to a position of a setting value 441.

In step S208, the CPU 101 determines whether a touch-up operation is detected on the touch panel. If the touch-up operation is detected (YES in step S208), the operation proceeds to step S209. If the touch-up operation is not detected (NO in step S208), the operation returns to step S206.

Next, in step S209, the CPU 101 causes the display screen to return to the setting screen with a display pattern as illustrated in FIG. 3, and the setting screen is displayed on the display 105. This setting screen indicates that an item is being selected, but not in operation. In step S210, the CPU 101 determines whether an end of the setting screen is instructed by the user operating the operation unit 106. If the end of the setting screen is instructed (YES in step S210), the operation ends. If the end of the setting screen is not instructed (NO in step S210), the operation returns to step S202.

On the other hand, if the area in which the touch-down operation is detected is not within the touch area of the currently selected item (NO in step S203), the operation proceeds to step S211. In step S211, the CPU 101 shifts the display screen to a display pattern indicating that the item in the area in which the touch-down operation is detected is undergoing a selection operation, and causes the display 105 to display the display pattern. A setting screen 500 illustrated in FIG. 5A indicates that a "blur" item 501 is selected and undergoing a selection operation. A setting screen 520 illustrated in FIG. 5B indicates that a "WB" item 521 is selected and undergoing a selection operation. In such a display pattern indicating that an item is undergoing a selection operation, the CPU 101 reacts to a move operation in the Y direction 305.

Figure 5A:
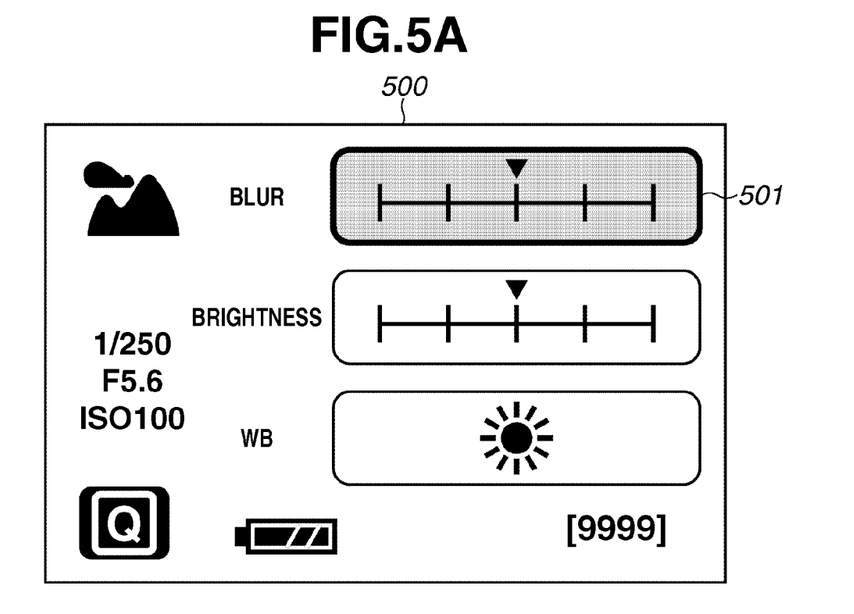
FIGS. 5A and 5B are diagrams each illustrating an example setting screen on which a selected item can be changed by a move operation.
Figure 5B:
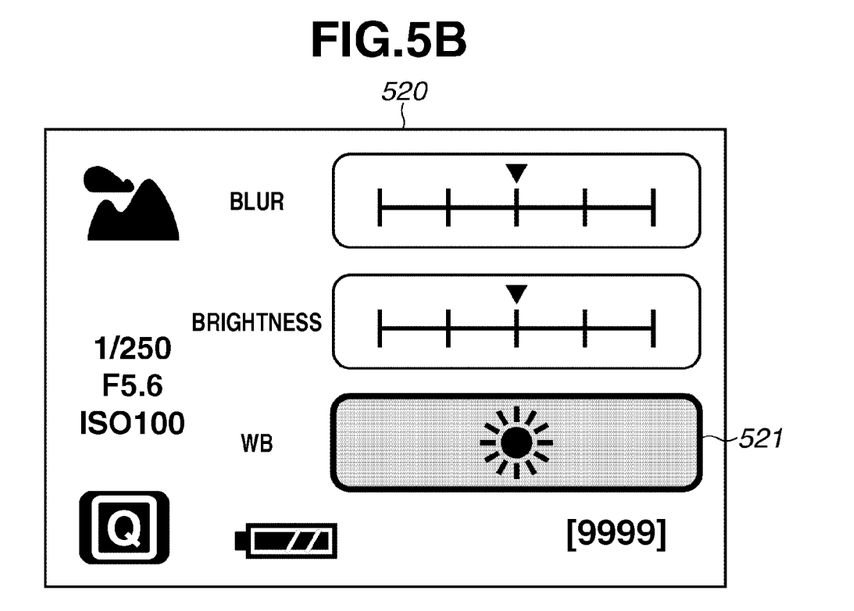

In step S212, the CPU 101 determines whether a move operation in the Y direction 305 is detected on the touch panel. If the move operation in the Y direction 305 is detected (YES in step S212), the operation proceeds to step S213. If the move operation in the Y direction 305 is not detected (NO in step S212), the operation proceeds to step S214. In a display pattern indicating that an item is undergoing a selection operation as illustrated in FIGS. 5A and 5B, a move operation in the X direction, that is, an operation for changing a setting value of the type-1 item, is invalid (not accepted).

In step S213, the CPU 101 determines an amount of the movement in the Y direction on the touch panel, and causes the display 105 to display a screen on which the selected item is shifted according to the movement amount. For example, assume that the "WB" item 521 is first selected as illustrated in FIG. 5B, and then a move operation is performed to a position of the "blur" item 501. In this case, the display 105 displays the setting screen 500 on which the "blur" item 501 is selected as illustrated in FIG. 5A.

In step S214, the CPU 101 determines whether a touch-up operation is detected on the touch panel. If the touch-up operation is detected (YES in step S214), the operation proceeds to step S209. If the touch-up operation is not detected (NO in step S214), the operation returns to step S212.

On the other hand, if the currently selected item is determined as the type-2 item (NO in step S204), the operation proceeds to step S215. In step S215, the CPU 101 shifts the display screen to a display pattern indicating that the item in the area in which the touch-down operation is detected is undergoing a selection operation, and causes the display 105 to display the display pattern. Herein, the display 105 displays the screen as illustrated in FIG. 5B.

In step S216, the CPU 101 determines whether a move operation in the Y direction 305 is detected on the touch panel. If the move operation in the Y direction 305 is detected (YES in step S216), the operation proceeds to step S217. If the move operation in the Y direction 305 is not detected (NO in step S216), the operation proceeds to step S218. Herein, the CPU 101 invalidates (does not accept) a move operation in the X direction 304, that is, an operation for changing a setting value of the type-1 item.

Subsequently, in step S217, the CPU 101 determines an amount of the movement in the Y direction on the touch panel, and causes the display 105 to display a screen on which the selected item is shifted according to the movement amount. This processing is substantially the same as that in step S213. When the selected item in the area in which the touch-down operation is detected is changed as a result of the movement in the Y direction, the CPU 101 sets a flag to 1 and stores the set flag in the memory 102.

In step S218, the CPU 101 determines whether a touch-up operation is detected on the touch panel. If the touch-up operation is detected (YES in step S218), the operation proceeds to step S219. On the other hand, if the touch-up operation is not detected (NO in step S218), the operation returns to step S216.

Next, in step S219, the CPU 101 determines whether the flag is set to 1 by the processing in step S217. If the flag is set to 1 (YES in step S219), the operation proceeds to step S209 as a focus (an item) has been shifted from that detected at the time of the touch-down operation. If the flag is not set to 1 (NO in step S219), the operation proceeds to step S220.

Figure 6:
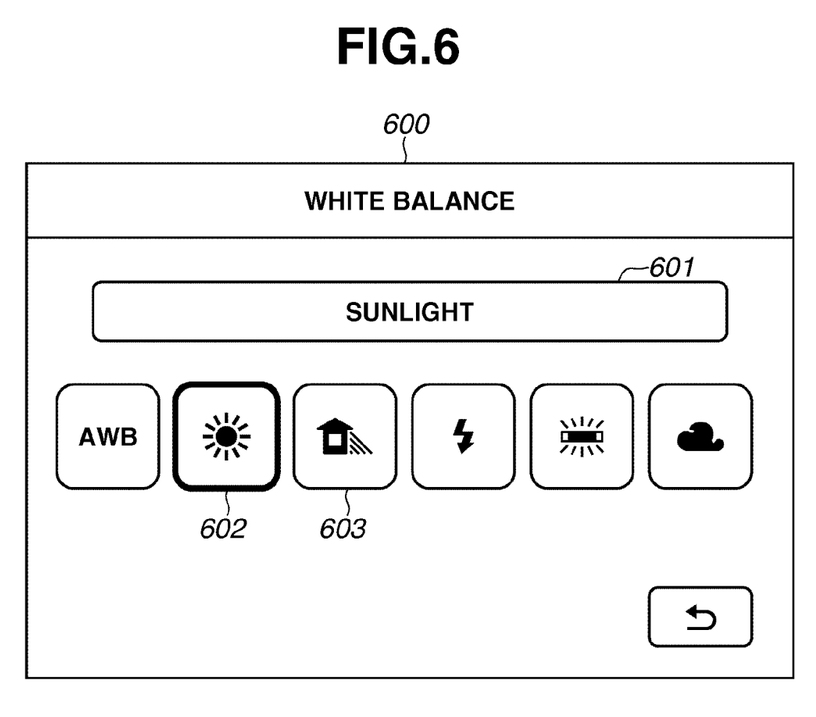
FIG. 6 is a diagram illustrating an example of a sub-screen shifted from a type-2 item.

In step S220, the CPU 101 causes the display 105 to display a sub-screen of the selected type-2 item. FIG. 6 illustrates a display example of a sub-screen 600 having undergone a screen transition from the "WB" item 521 illustrated in FIG. 5B.

Next, in step S221, the CPU 101 stores a setting value in the memory 102, the setting value corresponding to the area in which the touch-down operation is detected on the touch panel. For example, in step S220, in a case where the sub-screen 600 illustrated in FIG. 6 is displayed, letters "SUNLIGHT" are displayed in a description field 601, and a "sunlight" item 602 is set in a current setting. In this sub-screen 600, if a user selects, for example, an item 603 by the touch-down operation, the CPU 101 stores a setting value of the item 603 in the memory 102. Upon completion of such setting value selection processing, the operation proceeds to step S209.

In the examples illustrated in FIGS. 3 to 6, a move operation is performed in an X direction to change a setting value, and a move operation is performed in a Y direction to change a selected item. Alternatively, a screen on which selection items are arranged in an X direction and a setting value is changed in a Y direction may be displayed. In this case, a move operation becomes invalid in a direction opposite to that of each of the illustrated examples.

According to the present exemplary embodiment, a move operation only in an X direction is valid when a user selects a type-1 item by touch-down operation, and a move operation in a Y direction is valid when a user selects a type-2 item. In the type-1 item, particularly, a difference in behavior based on a direction of a move operation subsequent to a touch-down operation can be displayed and notified to a user during the touch-down operation. Accordingly, in an electronic apparatus including a type-1 item and a type-2 item on the same screen with the complexities of items for which values need to be set on a touch panel, a difference in behavior subsequent to a touch-down operation can be displayed and notified to a user, thereby enhancing usability.

The CPU 101 may control the entire apparatus by using one hardware, or a plurality of hardware by sharing processing. Moreover, while the present disclosure has been described with reference to an exemplary embodiment, it is to be understood that the disclosure is not limited to the disclosed exemplary embodiments. The scope of the following claims is to be accorded the broadest interpretation so as to encompass all modifications, equivalent structures, and functions. In addition, the above exemplary embodiment is merely one exemplary embodiment of the present disclosure.

In the exemplary embodiment, moreover, the present disclosure has been described by using an apparatus including an imaging unit as an example. However, the present exemplary embodiment is not limited to such an example. The present exemplary embodiment can be applied to a display control apparatus capable of receiving a touch input. That is, the present exemplary embodiment can be applied to a personal computer, a personal digital assistant (PDA), a mobile phone terminal, a portable image viewer, a printer apparatus including a display, a digital photo frame, a music player, a game apparatus, and an electronic book reader.

Aspects of the present disclosure can also be realized by a computer of a system or apparatus (or devices such as a CPU, a micro processing unit (MPU), and/or the like) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., a non-transitory computer-readable medium).

While the present disclosure has been described with reference to exemplary embodiments, it is to be understood that the disclosure is not limited to the disclosed exemplary embodiments. The scope of the following claims is to be accorded the broadest interpretation so as to encompass all modifications, equivalent structures, and functions.

This application claims priority from Japanese Patent Application No. 2012-067939 filed Mar. 23, 2012, which is hereby incorporated by reference herein in its entirety.

What is claimed is:

1. A display control apparatus comprising:
  a detection unit configured to detect a touch operation and a move operation without releasing on a display unit;
  a display control unit configured to control a display screen to be displayed on the display unit, the display screen including a plurality of items including a first item enabling a user to change a setting value in response to the touch operation in an area of the first item without screen transition, and a second item enabling the display screen to transition to a different display screen in response to the touch operation in an area of the second item;
  a selection unit configured to select one of the plurality of items in response to the touch operation detected by the detection unit; and
  a control unit configured to,
  (a) in a first case where the first item has been selected by the selection unit and a touch-down operation for touching the display screen is detected in the area of the first item by the detection unit, change a setting value corresponding to the first item in response to the move operation in the first direction continuing from the touch-down operation, and control the selection unit not to change the selected item in response to the move operation in the second direction continuing from the touch-down operation,
  (b) in a second case where the second item has been selected by the selection unit and a touch-down operation is detected in the area of the second item by the detection unit, control the selection unit to change the selected item in response to the move operation in the second direction continuing from the touch-down operation, (c) in a third case where the first item has not been selected by the selection unit and the touch-down operation for the display screen is detected in the area of the first item by the detection unit, control the selection unit not to change the setting value corresponding to the first item even if the move operation in the first direction continuing from the touch-down operation is performed, and control the selection unit to change the selected item in response to the move operation in the second direction continuing from the touch-down operation.

2. The display control apparatus according to claim 1, wherein the display control unit causes the display unit to
display the first item in a display mode in the first case,
display the first item in a second display mode in the second case,
display the first item in a third display mode in the third case, and
display the first item in a fourth display mode in a fourth case where the touch operation is not detected by the detection unit under the condition that the first item is selected by the selecting unit,
the first to fourth display modes being different from each other.

3. The display control apparatus according to claim 2, wherein,
the first display mode indicates that an operation for changing a setting value of the first item is being accepted,
the second display mode indicates that an item different from the first item is being selected,
the third display mode indicates that the first item is undergoing a selection operation and is being selected, and
the fourth display mode indicates that the first item is an item being currently selected by the selecting unit.

4. The display control apparatus according to claim 1, wherein, in the second case, when a touch-up operation for releasing a touch is detected without moving the touch position, the display control unit causes the display screen to transition to the different display screen.

5. The display control apparatus according to claim 4, wherein, in the second case, when the touch-up operation is detected, after the selected item is changed by the selection unit in response to the move operation in the second direction continuing from the touch-down operation, the display control unit does not cause the display screen to transition to the different display screen.

6. The display control apparatus according to claim 1, wherein the display control apparatus includes an imaging apparatus including an imaging unit.

7. The display control apparatus according to claim 6, wherein each of the first item and the second item is used for a setting related to image capturing by the imaging unit.

8. The display control apparatus according to claim 7, wherein the second item is used for a white balance setting and the different display screen is a display screen in which candidates of setting values of white balance including sun light are list-displayed.

9. A method for controlling a display control apparatus, the method comprising:
detecting a touch operation and a move operation without releasing on a display unit;
controlling a display screen to be displayed on the display unit, the display screen including a plurality of items including a first item enabling a user to change a setting value in response to the touch operation in an area of the first item without screen transition, and a second item enabling the display screen to transition to a different display screen in response to the touch operation in an area of the second item;
selecting one of the plurality of items in response to the touch operation detected by the detecting; and
controlling,
(a) in a first case where the first item has been selected by the selecting and a touch-down operation is detected in the area of the first item by the detecting, to change a setting value corresponding to the first item in response to the move operation in the first direction continuing from the touch-down operation, and not to change the selected item in response to the move operation in the second direction continuing from the touch-down operation,
(b) in a second case where the second item has been selected by the selecting and a touch-down operation is detected in the area of the second item by the detecting, the selecting to change the selected item in response to the move operation in the second direction continuing from the touch-down operation, and
(c) in a third case where the first item has not been selected by the selecting and the touch-down operation for the display screen is detected in the area of the first item by the detecting, to control the selecting not to change the setting value corresponding to the first item even if the move operation in the first direction continuing from the touch-down operation is performed, and to control the selecting to change the selected item in response to the move operation in the second direction continuing from the touch-down operation.

10. A non-transitory computer-readable storage medium storing a program that causes a computer to execute a method for controlling a display control apparatus, the method comprising:
detecting a touch operation and a move operation without releasing on a display unit;
controlling a display screen to be displayed on the display unit, the display screen including a plurality of items including a first item enabling a user to change a setting value in response to the touch operation in an area of the first item without screen transition, and a second item enabling the display screen to transition to a different display screen in response to the touch operation in an area of the second item;
selecting one of the plurality of items in response to the touch operation detected by the detecting; and
controlling,
(a) in a first case where the first item has been selected by the selecting and a touch-down operation is detected in the area of the first item by the detecting, change a setting value corresponding to the first item in response to the move operation in the first direction continuing from the touch-down operation, and control the selecting not to change the selected item in response to the move operation in the second direction continuing from the touch-down operation,
(b) in a second case where the second item has been selected by the selecting and a touch-down operation is detected in the area of the second item by the detecting, the selecting to change the selected item in response to the move operation in the second direction continuing from the touch-down operation, and
(c) in a third case where the first item has not been selected by the selecting and the touch-down operation for the display screen is detected in the area of the first item by the detecting, to control the selecting not to change the setting value corresponding to the first item even if the move operation in the first direction continuing from the touch-down operation is performed, and to control the selecting to change the selected item in response to the move operation in the second direction continuing from the touch-down operation.

* * * * *